US012674341B1

(12) United States Patent
Smith

(10) Patent No.: US 12,674,341 B1
(45) Date of Patent: Jul. 7, 2026

(54) BOLT SECURITY DEVICE AND RELATED METHODS

(71) Applicant: Bruce Smith, Hughson, CA (US)

(72) Inventor: Bruce Smith, Hughson, CA (US)

( * ) Notice: Subject to any disclaimer, the term of this patent is extended or adjusted under 35 U.S.C. 154(b) by 0 days.

(21) Appl. No.: 19/260,631

(22) Filed: Jul. 7, 2025

(51) Int. Cl.
*E05B 67/38* (2006.01)

(52) U.S. Cl.
CPC .................................... *E05B 67/38* (2013.01)

(58) Field of Classification Search
CPC ......... E05B 67/36; E05B 67/38; E05B 67/383
See application file for complete search history.

(56) References Cited

U.S. PATENT DOCUMENTS 4,602,903 A 7/1986 Wilburn
5,071,300 A 12/1991 McCauley
5,179,848 A * 1/1993 Kief ......................... B62J 11/00 224/454
5,214,945 A * 6/1993 Martin .................... E05B 67/36 70/DIG. 57
5,890,859 A 4/1999 Hasnik
6,135,691 A 10/2000 Nadarajah et al.
6,273,658 B1 8/2001 Patterson et al.
7,004,701 B2 2/2006 Ross
7,445,414 B1 11/2008 Notaro et al.
8,051,690 B2 11/2011 Camisasca
2009/0303043 A1 12/2009 Albarhri
2011/0027044 A1 2/2011 Dillenberger
2012/0047973 A1* 3/2012 Su ............................ G05G 5/02 70/174
2018/0044946 A1* 2/2018 Horton .................... E05B 67/00

FOREIGN PATENT DOCUMENTS

EP 2224144 B1 11/2015
GB 2352788 A 2/2001

OTHER PUBLICATIONS

Jeysons Industries—Bolt and Nut Protection Caps—retrieved on May 16, 2025; https://jeysons.com/bolt-and-nut-protection-caps/.
Vestil Manufacturing Corp.—Bolt Covers (BC-BK, BC-WT)—Product Family Page—retrieved on May 16, 2025; https://www.vestil.com/product.php?FID=696.
Bryce Fastener—Best High Security Fasteners—Anti Theft Security Bolts, Wood Security Screws, Vandal Resistant Nuts, Locking Bolts, & Tamper Proof Screws—retrieved on May 16, 2025; https://www.brycefastener.com.

* cited by examiner

*Primary Examiner* — Christine M Mills
*Assistant Examiner* — Yahya Sidky
(74) *Attorney, Agent, or Firm* — Sierra IP Law, PC; William K. Nelson

(57) ABSTRACT

A bolt security device is provided for protecting a bolt from theft, tampering, or unauthorized removal. The device includes a collar that engages with a bolt, an upper body and a lower body that enclose the collar, and a padlock that locks the bodies together. When assembled, the device restricts access to the bolt head, preventing the bolt from being loosened or removed without unlocking the padlock. The design allows for simple installation and enhanced security using standard locking components.

18 Claims, 16 Drawing Sheets

BOLT SECURITY DEVICE AND RELATED METHODS

FIELD OF THE INVENTION

The present invention relates generally to a bolt security device. More particularly, the present invention provides a bolt security device operable to enclose and protect a bolt from unauthorized access or tampering.

BACKGROUND OF THE INVENTION

Conventional fasteners, such as bolts and nuts, are widely used in infrastructure, transportation systems, and industrial equipment to secure structural components. In many of these applications, the exposed head of a bolt presents a vulnerability to theft, tampering, or unintentional loosening due to environmental exposure or vibration. To address these concerns, various protective devices have been developed to shield or obscure bolt heads and nuts. Such devices often include plastic press-fit caps, metal shields, or threaded covers that resist corrosion or block tool access.

However, many existing bolt protection systems fail to provide comprehensive security. For example, plastic or metal bolt caps (such as the BoltShield® and Vestil® bolt covers) generally offer weatherproofing but do not prevent access to the bolt using conventional tools. Similarly, locking nuts or tamper-proof bolts with custom drive heads (such as Key-Rex® or Penta-Nut™ products) rely on proprietary tooling rather than mechanical enclosures to prevent removal. Some advanced designs integrate rotating shrouds or outer shells to deter gripping or application of torque with unauthorized tools. Others employ multiple nested components to house and shield a fastener. While these mechanisms improve security, they often leave gaps or seams accessible to prying tools, or they are complex to install and maintain.

There exists a need for a bolt security device that provides full encapsulation of the bolt, inhibits direct tool engagement, and is constructed to withstand tampering, harsh environments, and unauthorized removal.

SUMMARY OF THE INVENTION

The present invention relates to a bolt security device operable to secure a bolt against unauthorized access, tampering, or removal. The device is specifically designed to protect exposed bolts-particularly those affixed to a wall plate or structural surface, from theft, vandalism, or mechanical damage. The present invention encloses the bolt within a locking assembly that prevents tool engagement and restricts physical access.

In some embodiments, the bolt security device may include a collar, an upper body, a lower body, and a padlock. The collar may include a central opening operable to receive a bolt, and a flange extending radially from the collar body. The upper body and the lower body may each include a shackle channel and an annular groove. The shackle channels of the upper and lower bodies may align to receive a shackle of a padlock. The annular grooves of the upper and lower bodies may align to form an annular receiver that encloses the flange of the collar when the device is assembled. Once the padlock is secured through the shackle channels, the upper and lower bodies may be locked in position, thereby preventing access to the bolt head.

The collar of the present invention may include a central shaft positioned between a pair of flanges. These flanges may be axially spaced and may extend outward from the central shaft of the collar. The collar further includes a central opening configured to engage with a bolt, allowing the collar to be seated over the bolt. More specifically, the central opening of the collar may be secured to the bolt using a plurality of fastening mechanisms. For example, the central opening may include internal threads to engage with a threaded shank portion of the bolt, allowing the collar to be rotated into position and fixed axially.

In other embodiments, the central opening may be dimensioned for a press-fit or interference fit with the bolt shank. Alternatively, adhesives, set screws, retaining pins, or welding techniques may be employed to secure the collar in a fixed position relative to the bolt. These mounting options may ensure the collar remains rotationally stable and axially fixed during installation and operation of the bolt security device.

One of the flanged portions may be captured between the grooves of the upper and lower body, securing the collar in place and preventing axial withdrawal. The other flanged portion may remain exposed outside the assembled housing and may serve as a visual indicator or tamper-resistant barrier, although it does not engage structurally with the assembly.

The upper body may include a shackle channel separated between a pair of lateral flanges. The shackle channel may receive the shackle of a padlock, which may span laterally across the upper body when installed. In an interior portion of the upper body, adjacent with the central axis of the device, is an annular groove. The annular groove may be designed to receive and engage a flange of the collar in a mechanically interlocking manner. This groove may have a circular cross-section or a complementary profile that matches the geometry of the flange, such that when the upper and lower bodies are assembled, the flange becomes axially captured between opposing grooves. In such embodiments, the annular groove may include alignment features such as shoulders or lips to ensure concentric seating and to resist axial or rotational movement of the collar when the device is in a locked configuration.

In some embodiments, the shackle channel of the upper body may have a crescent shaped profile. This geometry accommodates the padlock channel while maintaining alignment and rotational clearance when mated with the bottom cover. The combined structure enables the bolt security device to be axially locked and rotatably coupled around the collar once the padlock is secured in place.

Similarly, the lower body may include a shackle channel and a complementary annular groove. The shackle channel of the lower body may be laterally extending and may align with the shackle channel of the upper body to form a continuous passageway to receive the shackle of a padlock. The shackle channel may be recessed into a central portion of the lower body and may be defined by opposing vertical or inclined sidewalls that provide lateral support for the inserted shackle.

The annular groove of the lower body may extend from the top surface of the lower body toward a bottom surface along a central axis of the device. More specifically, the annular groove may have a crescent-shaped or arcuate cross-sectional profile that is complementary to the flange of the collar. In some embodiments, the groove may be dimensioned to enclose the flange, thereby constraining axial movement while permitting rotational movement of the collar within the assembled housing. The lower body may further include a flat or contoured lower face configured to abut a structural surface, and may incorporate alignment features, such as raised ridges, recessed channels, or magnetic inserts, to ensure proper registration with the upper body prior to engagement of the padlock.

In some embodiments, the bolt security device may be assembled to protect a bolt from unauthorized removal or theft. Firstly, the central opening of the collar may engage with a bolt secured to a structural element, such as a mounting plate. Once the collar is seated over the bolt, the flange of the collar remains exposed. Subsequently, the upper and lower bodies may be positioned around the collar, where the annular groove of each body are concentrically aligned. The annular grooves may form a continuous annular receiver when the two bodies are joined, thereby fully enclosing the flanged portion of the collar. This engagement may axially constrain the collar within the device, preventing it from being lifted or withdrawn from the bolt shank while still allowing rotational movement.

The shackle channels of the upper and lower bodies—when aligned—may define a continuous lateral passage through which a padlock shackle may be inserted. The shackle may pass entirely through the channel, extending across both bodies, and may then be inserted into the padlock body to place the padlock in a locked configuration. Once the padlock is locked, the upper and lower bodies are secured together, and removal of either component is mechanically obstructed. Therefore, access to the bolt head is prevented without destruction of the bolt security device or unlocking the padlock.

In some embodiments, the shackle channel of each body may have a geometry complementary to the shackle of the padlock, thereby ensuring stable alignment during locking. The annular groove formed by the upper and lower bodies may be complementary to the flange, providing rotational coupling and axial constraint.

The bolt security device may be installed without any modifications to the existing bolt or the structural surface to which it is mounted. Once the padlock is engaged through the shackle channel and locked into place, the upper and lower bodies may be inseparable without unlocking, thereby enclosing the bolt head and restricting access. In such embodiments, the flanged portion of the collar may rotate freely within the annular receiver, while remaining axially locked, thereby resisting forced rotational removal of the bolt.

In some embodiments, the padlock used to secure the bolt security device may be a conventional U-shaped shackle lock, such as a hardened steel padlock with a round or rectangular body. Suitable examples include laminated steel padlocks, brass body padlocks, or high-security disc padlocks with shrouded shackles. For higher security applications, padlocks incorporating anti-pick features, key-retaining mechanisms, or weather-resistant coatings (e.g., Master Lock® Magnum series, Abloy® PL 330, or American Lock® A1100 series) may be employed. The padlock can be customized for end user to allow for keyed-alike padlocks through-out a particular facility or premises.

The bolt security device may be constructed from high-strength, tamper-resistant materials such as 17-4 PH stainless steel, anodized aluminum, or reinforced polymer composites. These materials may be selected based on environmental conditions, including outdoor, marine, and high-corrosion installations.

The bolt security device may be used in applications where bolt must remain both accessible and protected, such as utility covers, signage installations, structural panels, or equipment enclosures.

In some exemplary embodiments, the upper and lower bodies may include magnets configured to magnetically retain the two bodies in position prior to locking. This feature may facilitate ease of assembly and alignment, particularly in field installations where tools may be limited.

It is an aspect of the present invention to provide a bolt security device, the device comprising a collar for receiving a bolt, the collar having a flange and a central opening, and an upper body and a lower body, each comprising a shackle channel extending along a peripheral edge, the shackle channel being operable to receive a shackle of a padlock, and a groove having a complementary geometry operable to engage with the flange, wherein the upper body and the lower body are coupled to enclose the flange when the padlock is in a locked configuration.

It is a further aspect of the present invention to provide a bolt security device in which the shackle channel has a geometry complementary to the shackle of the padlock, the groove is annular and is complementary to the flange, and the groove of the upper and lower body form an annular receiver to enclose the flange when the upper and lower body are coupled together. The bolt may be secured to a structural surface, and the central opening of the collar may be threaded into the bolt. The bolt may be inaccessible until the device is unassembled. The upper body and the lower body may each include a magnet and may be magnetically coupled. The flange may be rotatably coupled and axially locked inside the annular receiver. The upper body may further comprise a pair of lateral flanges extending laterally from the shackle channel, and the pair of lateral flanges may not be shaped to conform to the geometry of the shackle.

It is an aspect of the present invention to provide a method for securing a bolt, the method comprising engaging a central opening of a collar with a bolt, placing an upper body and a lower body around the collar, each body comprising an annular groove and a shackle channel, engaging the annular groove of the upper and lower body with a flange of the collar to form an annular receiver enclosing a flange of the collar, aligning the shackle channel of the upper and lower body to receive a shackle of a padlock, and locking the padlock to secure the upper and lower body between the collar, preventing access to a head of the bolt.

It is a further aspect of the present invention to provide a method for securing a bolt in which the shackle channel is complementary to the shackle, the central opening engages with a threaded portion on the bolt, and the bolt head is inaccessible unless the upper body and the lower body are disassembled. The flange of the collar may be rotatably coupled and axially locked inside the annular receiver. The method may further comprise the step of locking the padlock by engaging the shackle with a padlock channel on the padlock body.

It is an aspect of the present invention to provide a system for protecting bolts from theft, the system comprising a bolt security device having a collar with a central opening engaged with a bolt and a flange, and an upper body and a lower body, each comprising a shackle channel complementary to a shackle of a padlock and an annular groove operable to engage with the flange, a bolt secured to a structural surface, the bolt having a bolt head, and a padlock having a shackle operable to align with the shackle channel, wherein the upper and lower body are coupled to form an annular receiver to enclose the flange and prevent access to the bolt head when the padlock is in a locked configuration.

It is a further aspect of the present invention to provide a system for protecting bolts from theft in which the annular groove is complementary to the flange, the bolt head is inaccessible unless the bolt security device is disassembled, and the upper body and the lower body each include magnets operable to magnetically couple and retain the bodies in position prior to insertion of the shackle. The flange of the collar may be rotatably coupled and axially locked inside the annular receiver.

Further aspects and embodiments will be apparent to those having skill in the art from the description and disclosure provided herein.

It is an object of the present invention to provide a bolt security device operable to protect a bolt from unwanted theft.

It is another object of the present invention to provide a locking enclosure that prevents unauthorized access to a bolt head.

It is an object of the present invention to provide a bolt security device that may be secured using a conventional padlock, without requiring specialized tools or fasteners.

It is an object of the present invention to provide a modular and tamper-resistant housing configured to prevent axial and rotational displacement of a collar engaged with a bolt.

It is an object of the present invention to enable rapid installation and removal of the bolt security device using a single locking component, while maintaining mechanical integrity under environmental or physical stress.

It is an object of the present invention to provide a bolt security device constructed from durable materials such as stainless steel or anodized aluminum, suitable for outdoor, industrial, or high-security applications.

It is an object of the present invention to provide a bolt security device that is resistant to forced entry using bolt cutters or similar mechanical tools.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
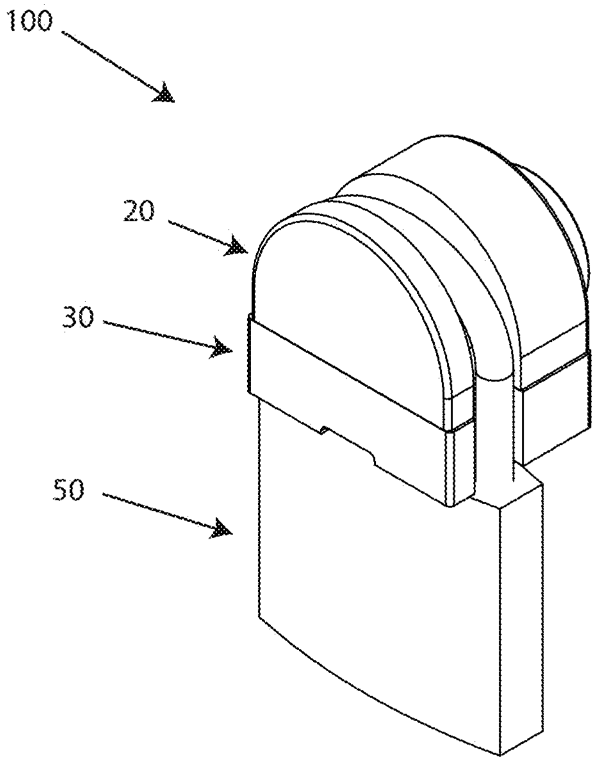
FIG. 1 provides a perspective view of a bolt security device, according to an embodiment of the present invention.
Figure 2A:
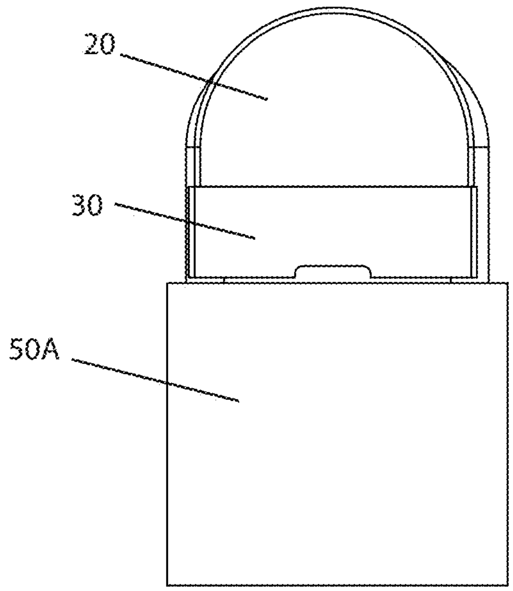
FIG. 2A provides a front view of a bolt security device, according to an embodiment of the present invention.
Figure 2B:
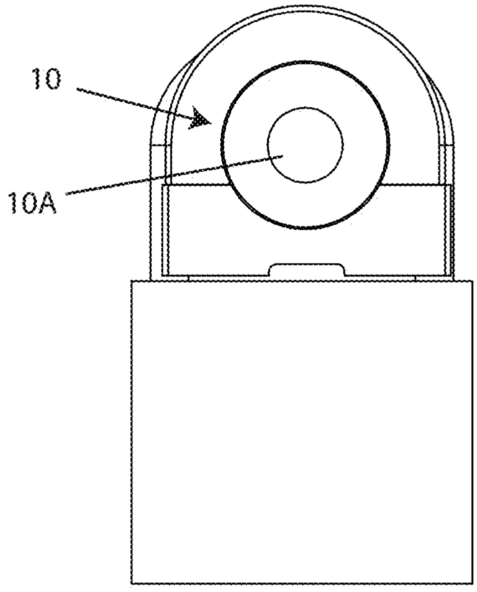
FIG. 2B provides a rear view of a bolt security device, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-17, it is seen that the present invention includes various embodiments of a bolt security device operable to enclose a bolt head.

Figure 13:
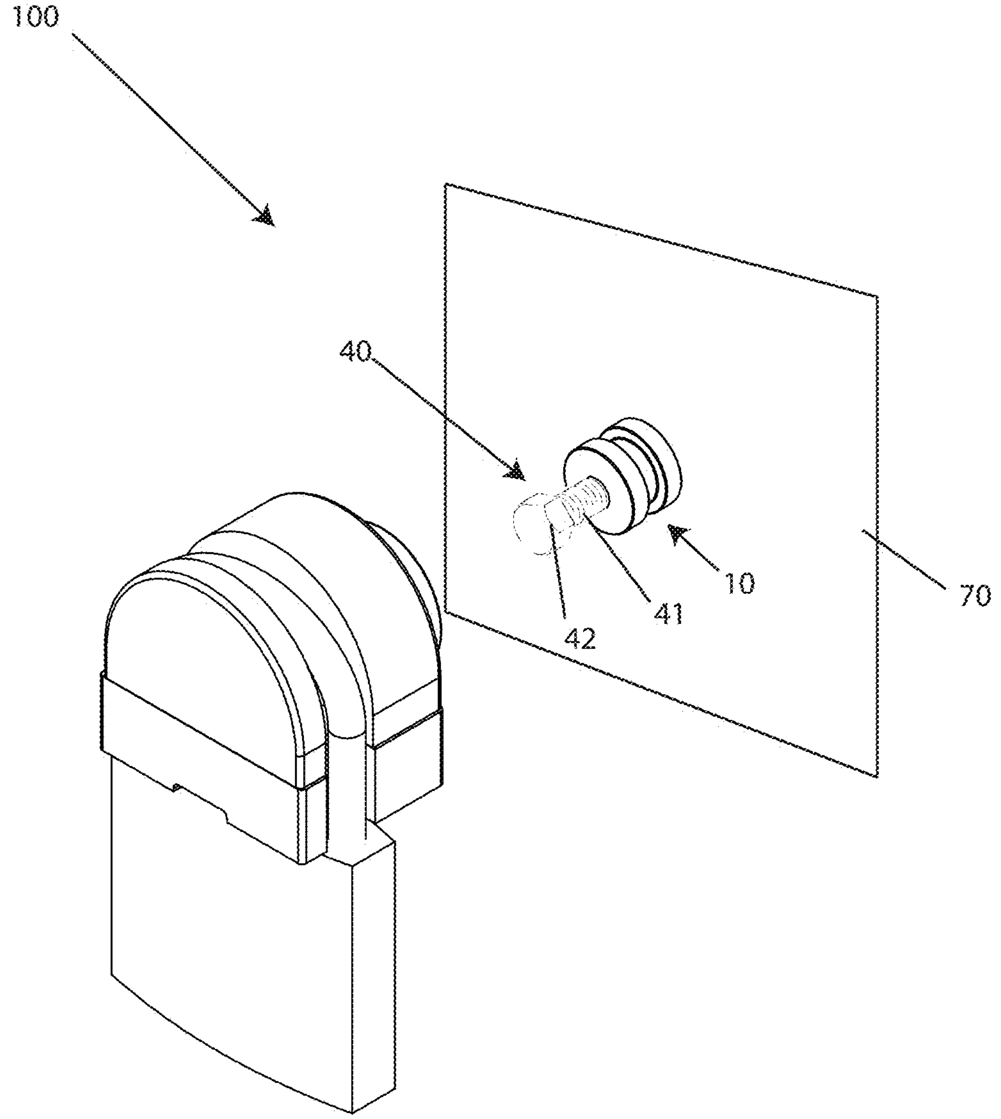
FIG. 13 provides an environmental view of a bolt security device, according to an embodiment of the present invention.
Figure 14:
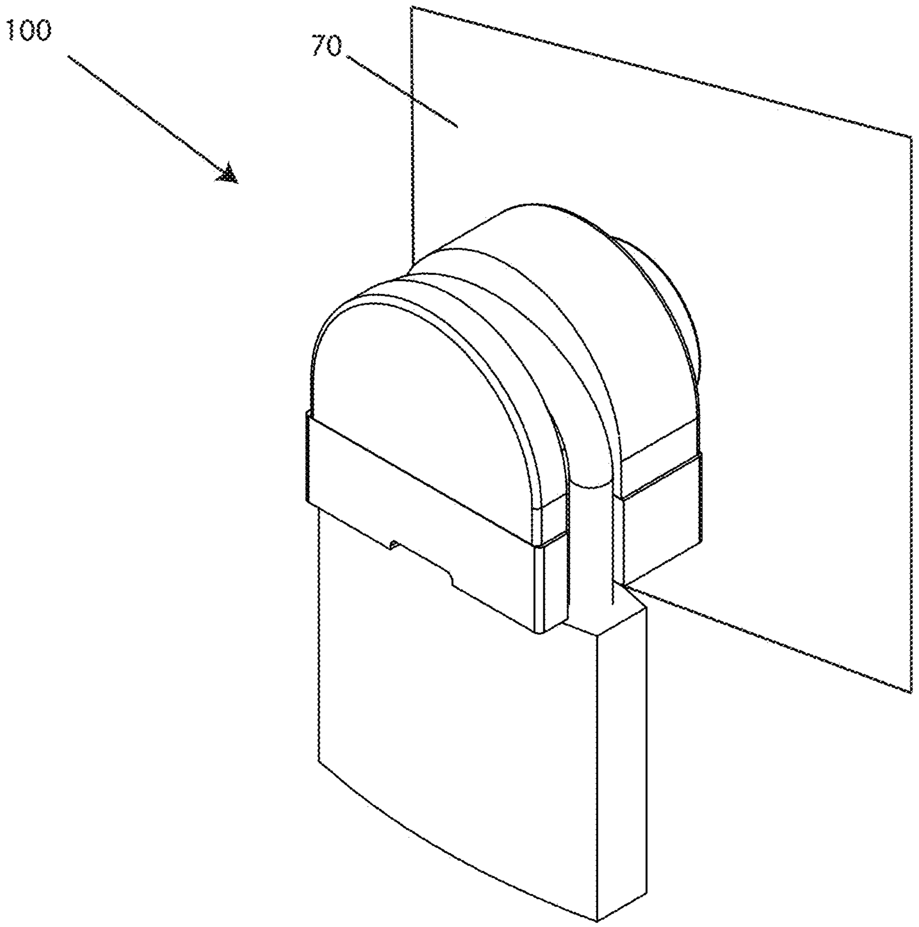
FIG. 14 provides a second environmental view of a bolt security device.

The present invention concerns a bolt security device 100 operable to secure a bolt 40, as shown in FIGS. 13-14. More specifically, the bolt security device 100 may include a collar 10, an upper body 20, a lower body 30, and a padlock 50. The collar 10 may engage with the bolt 40, which may be secured to a structural surface 70. Upper and lower bodies 20 and 30 may each include an annular groove (22, 32), and a shackle channel (23, 33).

The collar 10 may include a central opening 10A and a pair of radially extending flanges 11 (11A-11B). The central opening 10A may be generally cylindrical or partially threaded and may be configured to engage with a bolt 40. When assembling the bolt security device 100, one flange 11 may be enclosed within the upper and lower bodies, and the other flange may be exposed. In most embodiments, flange 11B may be exposed outside the assembly, and flange 11A may be enclosed between the upper and lower bodies (20, 30).

In some embodiments, the central opening may include internal threads that engage with a corresponding threaded portion 41 of the bolt 40, allowing the collar to be rotationally advanced and tightened directly onto the bolt. In other embodiments, the collar 10 may be non-threaded and instead seated over the bolt shank in a press-fit, slip-fit, or interference-fit arrangement. In still other embodiments, the collar 10 may be retained through a locking pin, adhesive compound, or a mechanical interference created by the geometry of the bolt or surrounding housing.

The collar 10 may be mounted over a bolt that is preinstalled into a structural surface 70, such as a wall plate, base frame, or mounting plate. The collar 10 may rest flush against the structural surface 70 or be positioned closer to the bolt head 42. Once installed, the collar 10 may serve as an intermediary structural member between the bolt 40 and the bolt security device 100, allowing rotational freedom of the device 100 while axially constraining access to the bolt head 42.

The upper body 20 and the lower body 30 may each include a machined or molded annular groove (22, 32), designed to receive a flange 11 of the collar 10. When assembled, the annular grooves (22, 32) may align concentrically to form an annular receiver 60 that axially captures the collar flange 11, thereby retaining the collar 10 in a fixed axial position relative to the housing. The grooves may have a crescent-shaped or arcuate profile that matches the contour of the collar flange 11 to enhance mechanical fit and stability.

Each of the upper and lower bodies may further include a shackle channel (21, 31), defined across a central portion of the respective component. These shackle channels may align during assembly to form a continuous passage to receive the shackle 51 of a padlock 50. When the upper and lower bodies are aligned and the padlock shackle 51 is inserted through the combined channel, the assembly may be locked in place. Once locked, the bolt head 42 may be obstructed by the device 100, thereby preventing removal or tampering without first unlocking and removing the padlock 50.

Figure 3A:
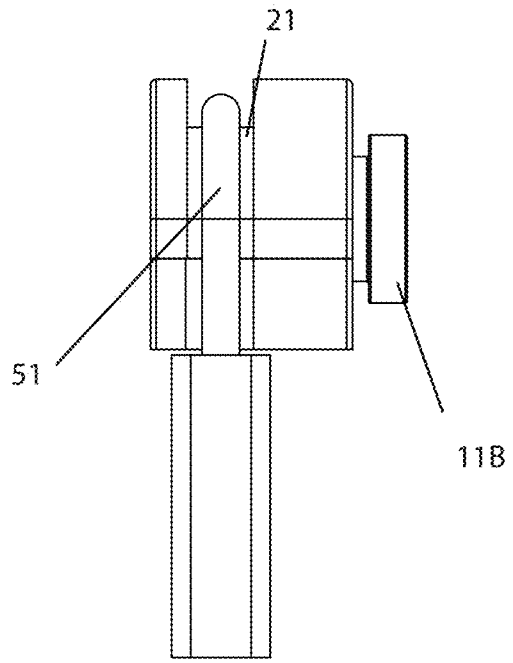
FIG. 3A provides a first side view of a bolt security device, according to an embodiment of the present invention.
Figure 3B:
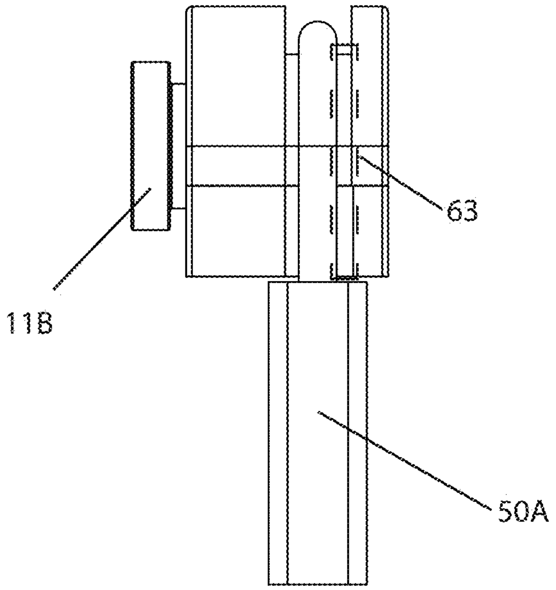
FIG. 3B provides a second side view of a bolt security device, according to an embodiment of the present invention.
Figure 4A:
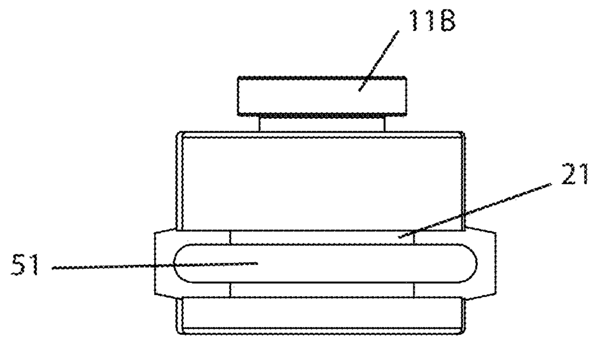
FIG. 4A provides a top view of a bolt security device, according to an embodiment of the present invention.
Figure 4B:
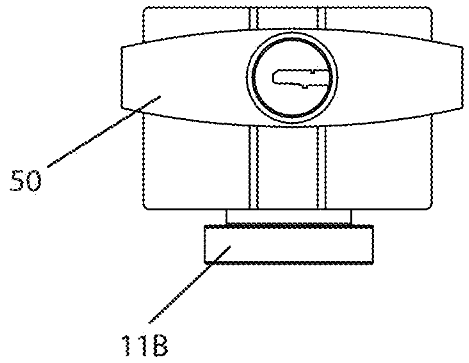
FIG. 4B provides a bottom view of a bolt security device, according to an embodiment of the present invention.
Figure 5:
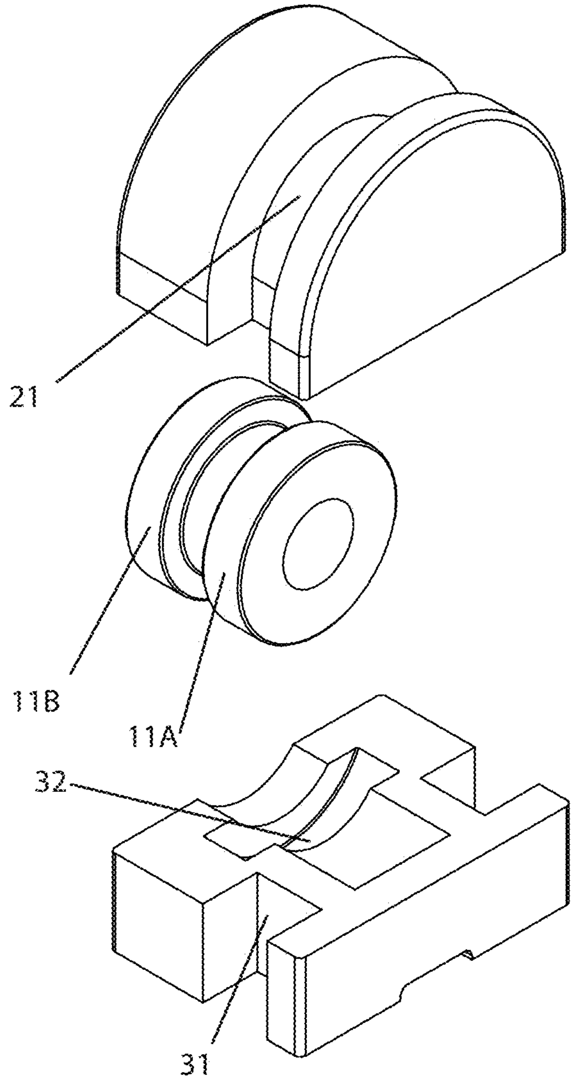
FIG. 5 provides a first exploded view of a bolt security device, according to an embodiment of the present invention.
Figure 6:
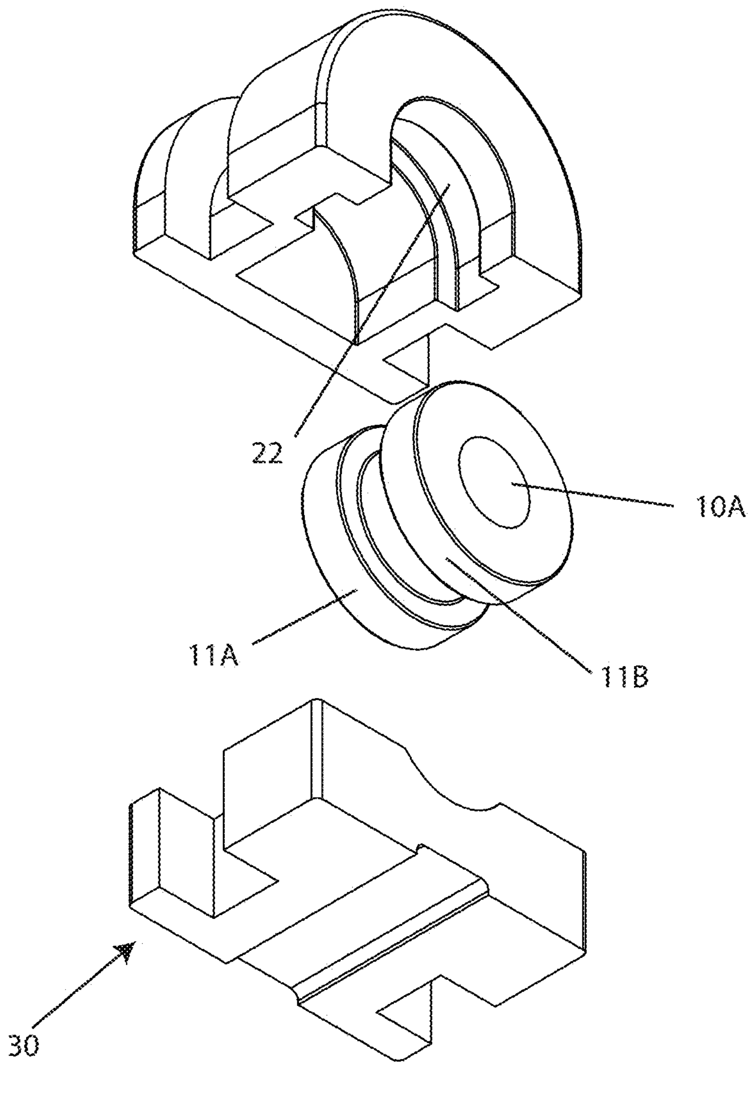
FIG. 6 provides a second exploded view of a bolt security device, according to an embodiment of the present invention.
Figure 7:
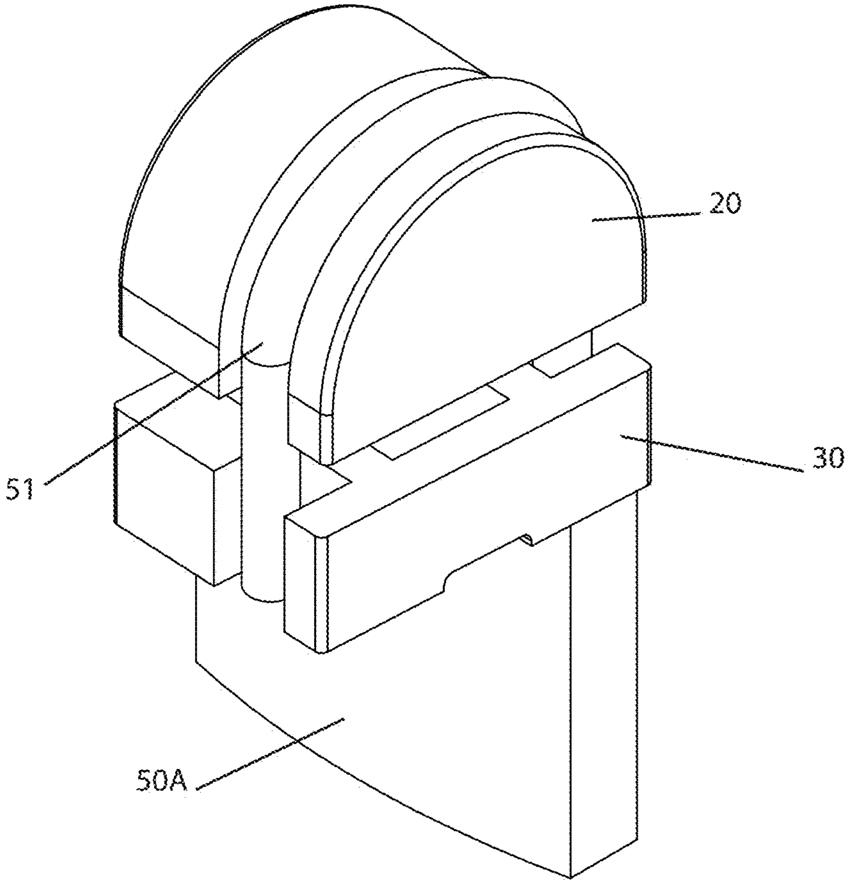
FIG. 7 provides a second perspective view of a bolt security device, according to an embodiment of the present invention.
Figure 8:
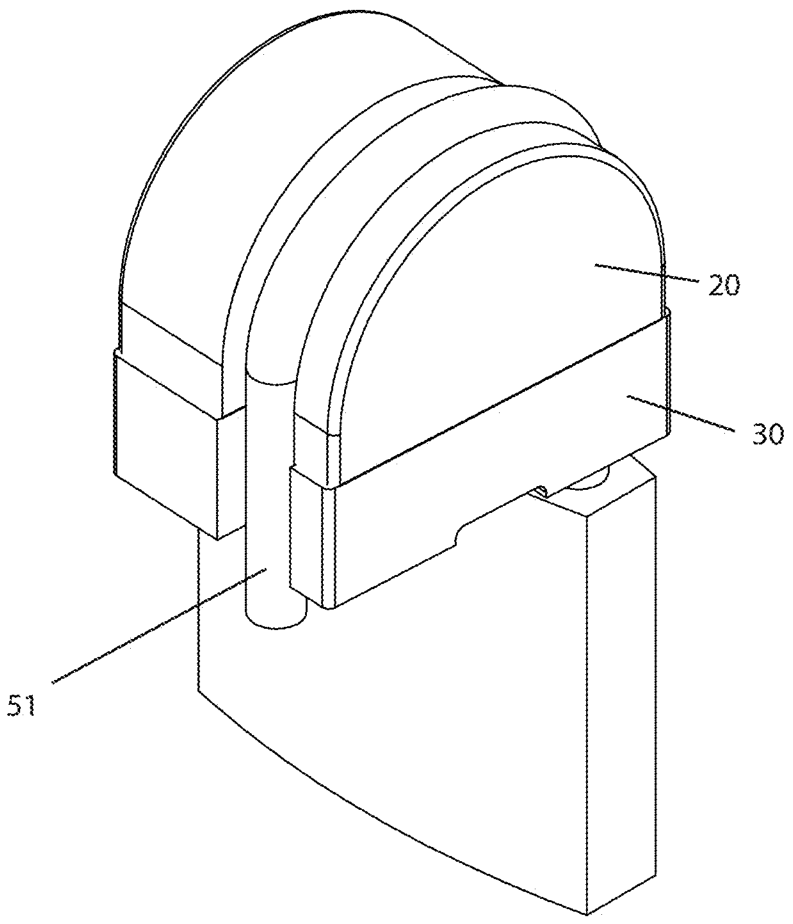
FIG. 8 provides a third perspective view of a bolt security device, according to an embodiment of the present invention.
Figure 9:
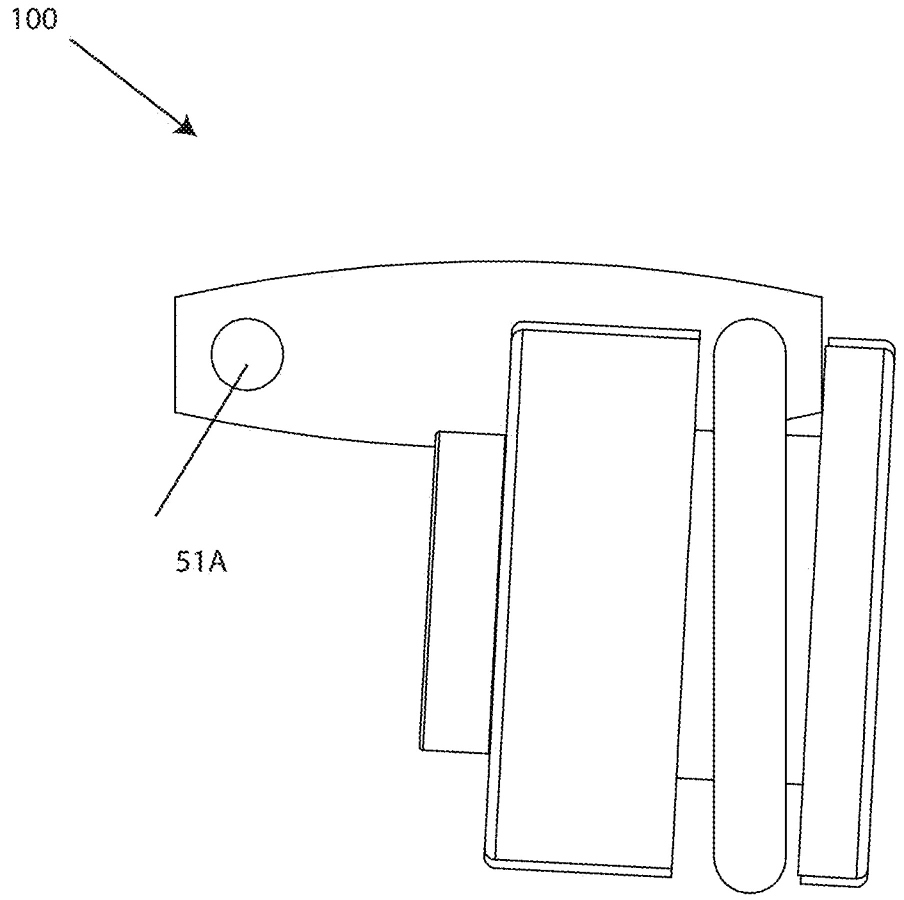
FIG. 9 provides a second top view of a bolt security device, according to an embodiment of the present invention.
Figure 10:
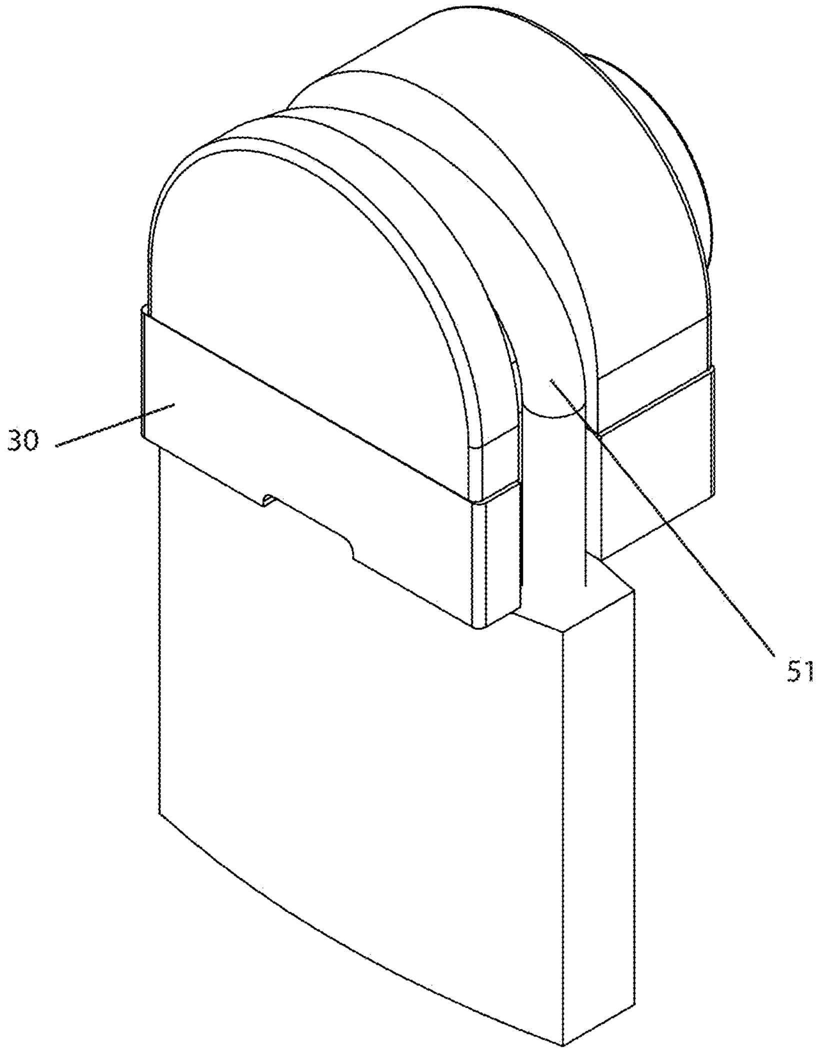
FIG. 10 provides a fourth perspective view of a bolt security device, according to an embodiment of the present invention.

In some embodiments, the bolt security device 100 may enclose and secure a bolt head 40, as shown in FIGS. 7-14. Firstly, the central opening 10A of the collar 10 may engage a bolt 40 secured to a structural surface 70. In such embodiments, the central opening 10A may have internal threads engaging with a threaded portion 41 on the bolt 40. Once the collar 10 is secured to the bolt 40, the upper and lower bodies (20, 30) may be positioned over the collar flange 11. More specifically, each groove (22, 32) may be concentrically aligned over the flange 11 to form an annular receiver 60 enclosing the flange 11 between the upper and lower bodies (20, 30). When aligned, the upper and lower bodies (20, 30) form a continuous shackle channel 63 to receive a shackle 51 of a padlock 50, as shown in FIG. 3B. Once the shackle 51 is positioned over channel 63, the padlock 50 may be locked by engaging the shackle 51 with a padlock channel 51A.

In some embodiments, the collar 10 may rotate freely within the annular receiver 60 but may be axially constrained by the engagement of the collar flange 11. The geometry of the collar 10 ensures that once the covers are assembled and secured by a padlock 50, the bolt 40 enclosed beneath the collar may not be accessed or turned without destructive force or removal of the lock 50.

Figure 15:
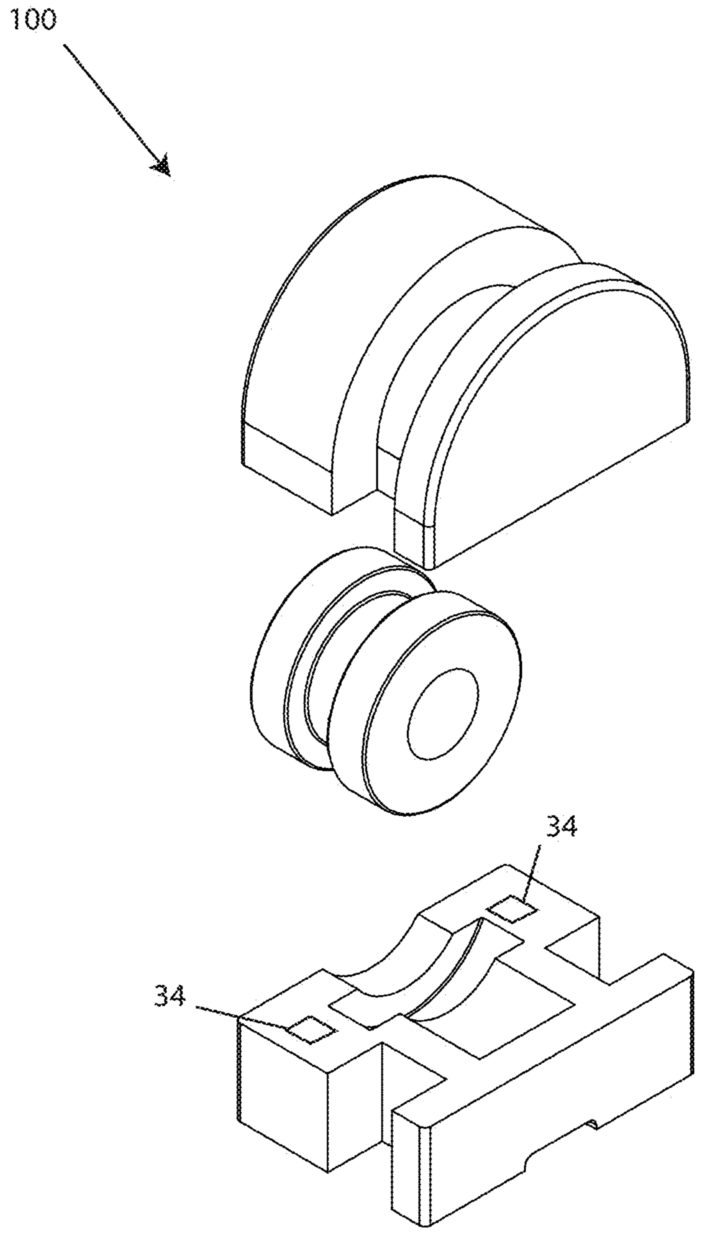
FIG. 15 provides a third exploded view of a bolt security device, according to an embodiment of the present invention.
Figure 16:
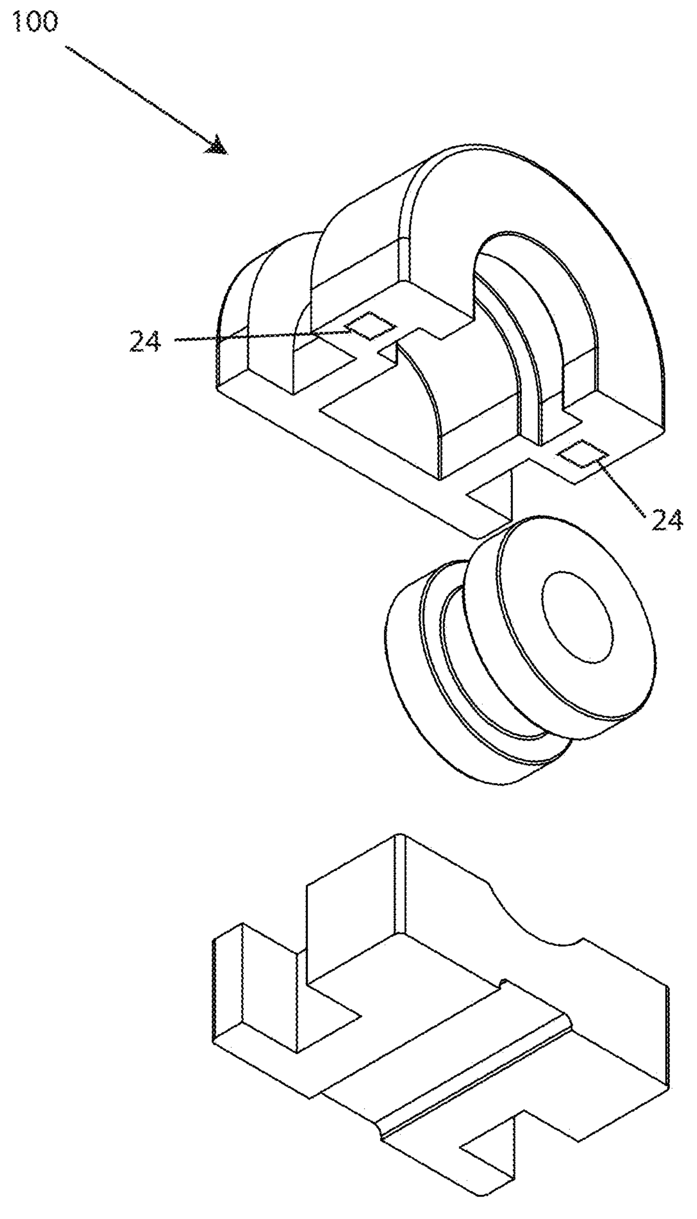
FIG. 16 provides a fourth exploded view of a bolt security device, according to an embodiment of the present invention.

In some embodiments, the upper body 20 and the lower body 30 may each include one or more embedded magnets (24, 34) designed to magnetically couple with one another and constrain the collar 10 during assembly, as shown in FIGS. 15-16. The magnets may be positioned adjacent to the annular grooves (22, 32) such that, when the upper and lower bodies (20, 30) are brought into alignment over the collar flange 11, the magnetic force may couple the upper body 20 and lower body 30 together and retain them in position prior to locking the padlock 50.

Magnets (24A-24B, 34A-34B) may be rare-earth types (e.g., neodymium) to provide sufficient holding force, or may be ferrite-based in applications requiring reduced magnetic signature. In such embodiments, the magnets may also engage with a ferromagnetic ring or insert integrated into the collar 10 itself, thereby contributing to axial retention and improving concentric alignment between the collar and the surrounding housing. The magnetic constraint may serve both as an assembly aid and a temporary securing mechanism, allowing the device to be positioned and held in place without tools while the padlock is being installed. This configuration may be particularly useful in field conditions or installations requiring rapid deployment without additional fasteners.

Figure 11A:
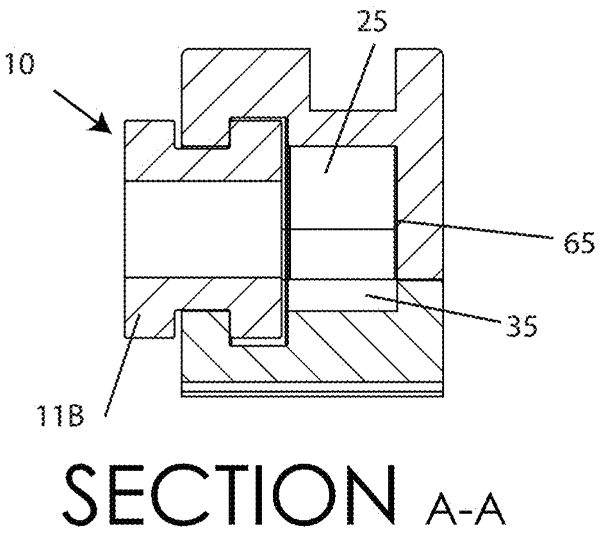
FIG. 11A provides a first cross-sectional view of a bolt security device, according to an embodiment of the present invention.
Figure 11B:
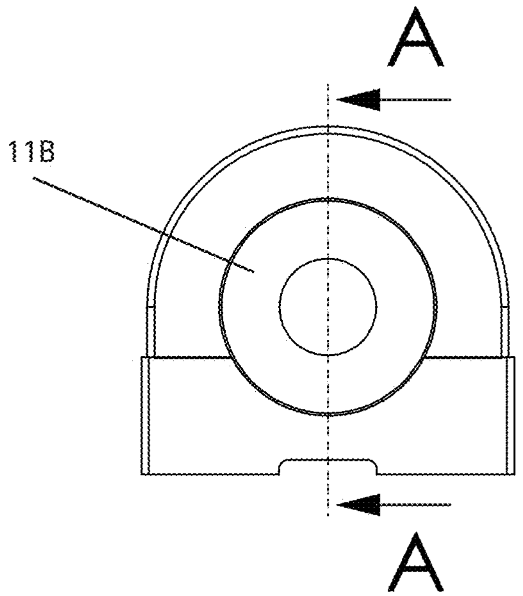
FIG. 11B provides a second cross-sectional view of a bolt security device, according to an embodiment of the present invention.
Figure 12A:
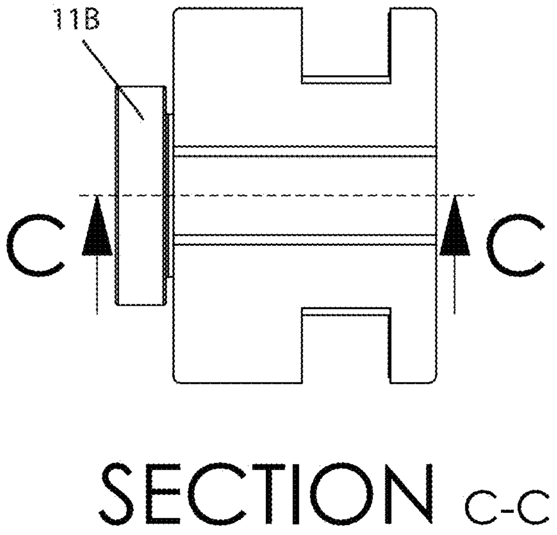
FIG. 12A provides a third cross-sectional view of a bolt security device, according to an embodiment of the present invention.
Figure 12B:
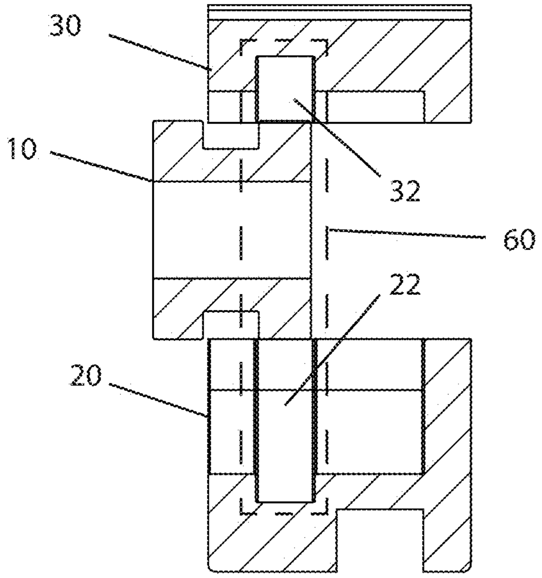
FIG. 12B provides a fourth cross-sectional view of a bolt security device, according to an embodiment of the present invention.

In some embodiments, the upper and lower bodies may respectively include partial recesses 25 and 35, each operable to receive a portion of the bolt head 42. During assembly of the device 100, as shown in FIG. 11, these recesses may align to form a continuous recess 65 to fully receive and house the bolt head 42. This continuous recess 65 allows the bolt security device to enclose the bolt head 42 without interference, ensuring a secure and flush fit between the security device 100 while maintaining axial alignment of the collar 10.

The continuous recess 65 may allow the device 100 to fully seat over bolts 40 of varying lengths without obstruction, ensuring that the bolt head remains properly positioned within the collar 10 while the excess portion of the bolt is accommodated within the assembled housing. This feature enhances compatibility with a broader range of bolt types and allows the device to be used in installations where bolt heads are not flush with the mounting surface.

The bolt security device 100 may be compatible with a variety of standard and specialty bolts 40 commonly used in structural, industrial, and outdoor applications. Suitable bolts may include hex head bolts, carriage bolts, socket cap screws, and anchor bolts. In some embodiments, the device may be used with partially threaded or fully threaded bolts, depending on the mounting configuration. The collar 10 and recess 65 may be dimensioned to accommodate standard bolt head geometries such as hexagonal, round, or domed profiles. Additionally, the device may be adapted for use with tamper-resistant bolts, including shear bolts, breakaway head bolts, and proprietary security bolts, where access to the bolt head 42 must be restricted after installation.

Figure 17:
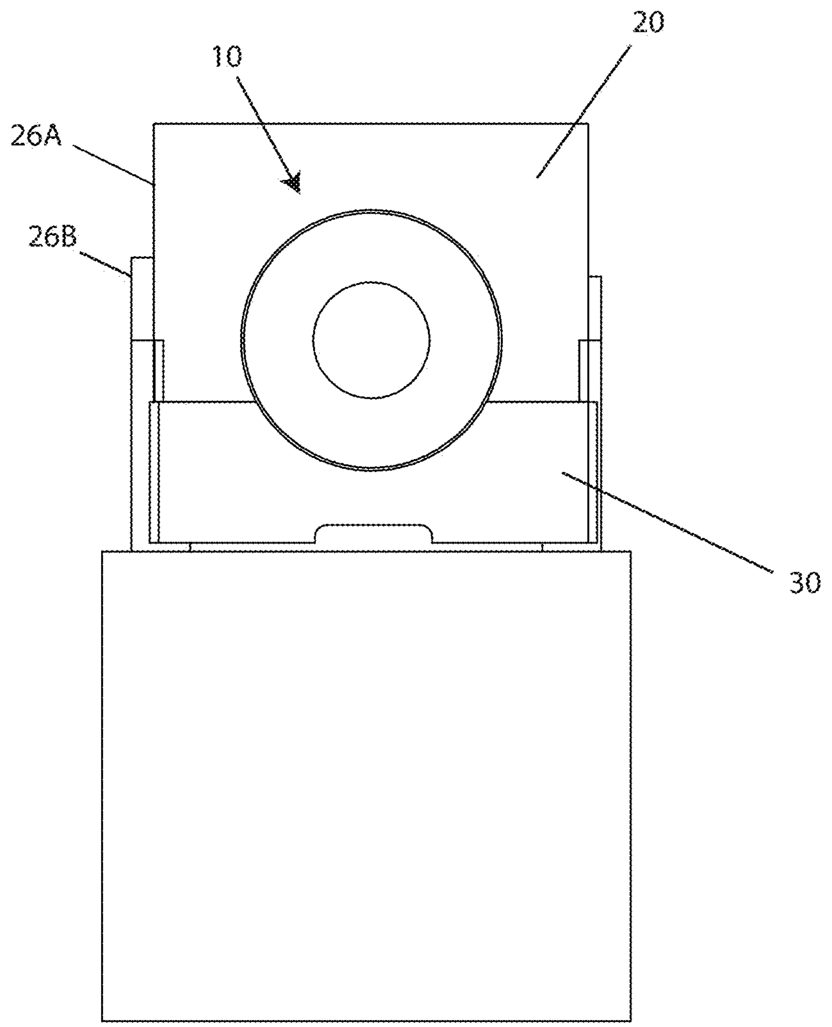
FIG. 17 provides a second front view of a bolt security device, according to an embodiment of the present invention.

In some exemplary embodiments, the upper body 20 of the bolt security device further comprises a pair of lateral flanges 26 (26A-26B) extending laterally from channel 21, as shown in FIG. 17. These lateral flanges 26 do not necessarily conform to the shape of the shackle 51 and may have varying geometries depending on the aesthetic, structural, or manufacturing requirements of the device 100. The function of the lateral flanges 26 is primarily to support the overall structure of the upper body 20 and to enclose the groove 22, while only the channel 21 itself is dimensioned to accommodate the shackle. Accordingly, the outer profiles of these lateral flanges may be circular, rectangular, polygonal, or irregular in shape and are not constrained by the geometry of the padlock 50.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A bolt security device, the device comprising:

a. a collar for receiving a bolt, said collar having a flange and a central opening; and b. an upper body and a lower body, each comprising:

i. a shackle channel that extends along a perimeter of said upper and lower body, said shackle channel operable to receive a length of a shackle of a padlock such that the length of said shackle is nested in said shackle channel; and ii. a groove having a complementary geometry operable to engage with said flange;

wherein said upper body and said lower body are coupled to enclose said flange when said padlock is in a locked configuration, and said central opening of said collar is threaded into said bolt.

2. The device of claim 1, wherein said shackle channel has a geometry complementary to said shackle of said padlock.

3. The device of claim 1, wherein said groove is annular and is complementary to said flange.

4. The device of claim 1, wherein said groove of said upper and lower body form an annular receiver to enclose said flange when said upper and lower body are coupled together.

5. The device of claim 1, wherein said bolt is secured to a structural surface.

6. The device of claim 4, wherein said flange is rotatably coupled and axially locked inside said annular receiver.

7. The device of claim 1, wherein said upper body further comprises a pair of lateral flanges extending laterally from said shackle channel.

8. The device of claim 1, wherein said pair of lateral flanges are not shaped to conform to the geometry of said shackle.

9. A method for securing a bolt, the method comprising:

a. engaging a central opening of a collar with a bolt;

b. placing an upper body and a lower body around said collar, each body comprising an annular groove and a shackle channel;

c. engaging said annular groove of said upper and lower body with a flange of said collar to form an annular receiver enclosing a flange of said collar;

d. aligning said shackle channel of said upper and lower body to receive a length of a shackle of a padlock; and e. locking said padlock to secure said upper and lower body between said collar, preventing access to a head of said bolt, wherein the length of said shackle is nested in said shackle channel.

10. The method of claim 9, wherein said shackle channel is complementary to said shackle.

11. The method of claim 9, wherein said central opening engages with a threaded portion on said bolt.

12. The method of claim 9, wherein said bolt head is inaccessible unless said upper body and said lower body are disassembled.

13. The method of claim 9, wherein said flange of said collar is rotatably coupled and axially locked inside said annular receiver.

14. The method of claim 9, further comprising the step of locking said padlock by engaging said shackle with a padlock channel in said padlock.

15. A system for protecting bolts from theft, the system comprising:

a. a bolt security device having:

i. a collar having a flange and a central opening engaged with a bolt; and ii. an upper body and a lower body, each comprising:

1. a shackle channel that extends along a perimeter of said upper and lower body said shackle channel operable to receive a length of a shackle of a padlock such that the length of said shackle is nested in said shackle channel;

2. an annular groove operable to engage with said flange;

b. said bolt secured to a structural surface, said bolt having a bolt head; and c. said padlock having a shackle operable to align with said shackle channel;

wherein said upper and lower body are coupled to form an annular receiver to enclose said flange and prevent access to said bolt head when said padlock is in a locked configuration, and said upper body and said lower body each include magnets operable to magnetically couple and retain said bodies in position prior to insertion of said shackle.

16. The system of claim 15, wherein said annular groove is complementary to said flange.

17. The system of claim 15, wherein said bolt head is inaccessible unless said bolt security device is disassembled.

18. The system of claim 15, wherein said flange of said collar is rotatably coupled and axially locked inside said annular receiver.

* * * * *